United States Patent
Inakura et al.

(10) Patent No.: US 11,948,748 B2
(45) Date of Patent: Apr. 2, 2024

(54) FILM CAPACITOR, AND FILM FOR FILM CAPACITORS

(71) Applicants: Murata Manufacturing Co., Ltd., Nagaokakyo (JP); Shizuki Electric Co., Inc., Nishinomiya (JP)

(72) Inventors: Tomoki Inakura, Nagaokakyo (JP); Tomomichi Ichikawa, Nagaokakyo (JP); Atsushi Kawabata, Nishinomiya (JP)

(73) Assignees: MURATA MANUFACTURING CO., LTD., Nagaokakyo (JP); SHIZUKI ELECTRIC CO., INC., Nishinomiya (JP)

( * ) Notice: Subject to any disclaimer, the term of this patent is extended or adjusted under 35 U.S.C. 154(b) by 179 days.

(21) Appl. No.: 17/743,598

(22) Filed: May 13, 2022

(65) Prior Publication Data
US 2022/0270823 A1    Aug. 25, 2022

Related U.S. Application Data

(63) Continuation of application No. PCT/JP2020/038454, filed on Oct. 12, 2020.

(30) Foreign Application Priority Data

Dec. 27, 2019   (JP) .................. 2019-237616

(51) Int. Cl.
*H01G 4/14*       (2006.01)
*C08G 18/48*      (2006.01)
(Continued)

(52) U.S. Cl.
CPC .............. *H01G 4/14* (2013.01); *C08G 18/48* (2013.01); *C08G 18/7692* (2013.01); *H01G 4/32* (2013.01);
(Continued)

(58) Field of Classification Search
CPC .. H01G 4/14; H01G 4/32; H01G 4/33; H01G 4/232; H01G 4/248; H01G 4/012;
(Continued)

(56) References Cited

U.S. PATENT DOCUMENTS 3,689,810 A * 9/1972 Walles ............... H01G 4/008
                                                    252/500
2008/0210946 A1* 9/2008 Okada ............ H01L 27/14603
                                                    257/E27.146
(Continued)

FOREIGN PATENT DOCUMENTS

| JP | H05251266 A   | 9/1993  |
|----|---------------|---------|
| JP | 2004363431 A  | 12/2004 |

(Continued)

OTHER PUBLICATIONS

International Search Report issued for PCT/JP2020/038454, dated Dec. 22, 2020.

*Primary Examiner* — Michael P McFadden
(74) *Attorney, Agent, or Firm* — ArentFox Schiff LLP

(57) ABSTRACT

A film capacitor that includes a dielectric resin film containing a cured product of a first organic material and a second organic material; and a metal layer on at least one surface of the dielectric resin film. The first organic material contains an organic polymer having a hydroxy group and a benzene ring in a repeating unit; the second organic material contains 4,4'-diphenylmethane diisocyanate, a modified product of 4,4'-diphenylmethane diisocyanate, or a mixture thereof; and 400 ppm to 700 ppm of chlorine ions and 300 ppm to 500 ppm of phosphorus ions are present inside the dielectric resin film.

20 Claims, 2 Drawing Sheets

(51) Int. Cl.
*C08G 18/76* (2006.01)
*H01G 4/232* (2006.01)
*H01G 4/248* (2006.01)
*H01G 4/32* (2006.01)
*H01G 4/33* (2006.01)

(52) U.S. Cl.
CPC ............... *H01G 4/33* (2013.01); *H01G 4/232* (2013.01); *H01G 4/248* (2013.01)

(58) Field of Classification Search
CPC . H01G 4/12; H01G 4/30; C08G 18/48; C08G 18/7692
See application file for complete search history.

(56) References Cited

U.S. PATENT DOCUMENTS

| | | | | |
|---|---|---|---|---|
| 2010/0075228 | A1* | 3/2010 | Yoshinaga | B01J 20/20 252/511 |
| 2014/0055909 | A1* | 2/2014 | Ning | H01G 9/04 361/301.4 |
| 2014/0355173 | A1* | 12/2014 | Odle | C08G 73/10 428/458 |
| 2014/0368970 | A1 | 12/2014 | Ichikawa et al. | |
| 2016/0251546 | A1* | 9/2016 | Nakajima | C09D 5/006 438/695 |
| 2018/0072828 | A1* | 3/2018 | Tamura | H01G 4/33 |
| 2019/0036029 | A1* | 1/2019 | Tamakuni | C08G 61/123 |
| 2019/0348220 | A1 | 11/2019 | Ichikawa et al. | |

FOREIGN PATENT DOCUMENTS

| | | |
|---|---|---|
| JP | 2009035606 A | 2/2009 |
| JP | 2009057473 A | 3/2009 |
| JP | 2015181199 A | 10/2015 |
| WO | 2013128726 A1 | 9/2013 |
| WO | 2017175511 A1 | 10/2017 |
| WO | 2018142922 A1 | 8/2018 |

* cited by examiner

FILM CAPACITOR, AND FILM FOR FILM CAPACITORS

CROSS REFERENCE TO RELATED APPLICATIONS

The present application is a continuation of International application No. PCT/JP2020/038454, filed Oct. 12, 2020, which claims priority to Japanese Patent Application No. 2019-237616, filed Dec. 27, 2019, the entire contents of each of which are incorporated herein by reference.

FIELD OF THE INVENTION

The present invention relates to a film capacitor and a film for film capacitors.

BACKGROUND OF THE INVENTION

One type of capacitor is a film capacitor that has a structure including a flexible resin film as a dielectric, a first counter electrode, and a second counter electrode opposing the first metal layer across the resin film. Such a film capacitor is produced by, for example, winding or laminating a resin film on which a first counter electrode is provided and a resin film on which a second counter electrode is provided.

Patent Literatures 1 to 4 describe dielectric resin films for film capacitors, the dielectric resin films being formed from a curable resin such as a thermosetting resin. For example, Patent Literature 1 discloses a dielectric resin composition for film capacitors which is a cured product obtainable by a reaction of at least two organic materials including first and second organic materials, wherein the first organic material is a polyol and the second organic material is an isocyanate compound or an epoxy resin or melamine resin having a plurality of functional groups in the molecule.

Patent Literature 1: JP 5794380 B
Patent Literature 2: JP 6194927 B
Patent Literature 3: WO 2017/175511
Patent Literature 4: WO 2018/142922

SUMMARY OF THE INVENTION

Dielectric resin films of a curable resin such as a thermosetting resin have better heat resistance and higher withstand voltage than dielectric resin films of a thermoplastic resin. However, Patent Literatures 1 to 4 performed no examination for long-term reliability. The present inventors measured the insulation resistance of these films in a long-term high-temperature voltage application test to find a high percentage change in insulation resistance relative to their initial value.

In Patent Literatures 1 to 4, a cured product is obtained by a reaction of two organic materials, but no examination was performed for the reactivity of these organic materials. Accordingly, those disclosed therein still have room for improvement in efficiency of film formation.

The various embodiments of the invention described herein were made to solve the above issues and aim to provide, in a first aspect, a film capacitor including a dielectric resin film that can be efficiently formed and that has high long-term reliability. In a second aspect, the present invention aims to provide a film capacitor that includes a dielectric resin film having high long-term reliability. In a third aspect, the present invention aims to provide a film capacitor including a dielectric resin film that can be efficiently formed. The various embodiments of the invention described herein also aim to provide a film for the film capacitors.

The film capacitor of one embodiment of the present invention includes a dielectric resin film containing a cured product of a first organic material and a second organic material; and a metal layer on at least one surface of the dielectric resin film. The first organic material contains an organic polymer having a hydroxy group and a benzene ring in a repeating unit. The second organic material contains 4,4'-diphenylmethane diisocyanate, a modified product of 4,4'-diphenylmethane diisocyanate, or a mixture thereof.

In a first aspect of the film capacitor of the present invention, 400 ppm to 700 ppm of chlorine ions and 300 ppm to 500 ppm of phosphorus ions are present inside the dielectric resin film.

In a second aspect of the film capacitor of the present invention, 400 ppm to 700 ppm of chlorine ions are present inside the dielectric resin film.

In a third aspect of the film capacitor of the present invention, 300 ppm to 500 ppm of phosphorus ions are present inside the dielectric resin film.

The first aspect, second aspect, and third aspect of the film capacitor of the present invention are simply referred to as a "film capacitor of the present invention" when no particular distinction is needed.

The film for film capacitors of a second embodiment of the present invention contains a cured product of a first organic material and a second organic material. The first organic material contains an organic polymer having a hydroxy group and a benzene ring in a repeating unit. The second organic material contains 4,4'-diphenylmethane diisocyanate, a modified product of 4,4'-diphenylmethane diisocyanate, or a mixture thereof.

In a first aspect of the film for film capacitors of the present invention, 400 ppm to 700 ppm of chlorine ions and 300 ppm to 500 ppm of phosphorus ions are present inside the film.

In a second aspect of the film for film capacitors of the present invention, 400 ppm to 700 ppm of chlorine ions are present inside the film.

In a third aspect of the film for film capacitors of the present invention, 300 ppm to 500 ppm of phosphorus ions are present inside the film.

Hereinafter, the first aspect, second aspect, and third aspect of the film for film capacitors of the present invention are simply referred to as a "film for film capacitors of the present invention" when no particular distinction is needed.

The first aspect of the present invention enables efficient formation of a dielectric resin film of a film capacitor and allows the dielectric resin film to have high long-term reliability. The second aspect of the present invention allows a dielectric resin film of a film capacitor to have high long-term reliability. The third aspect of the present invention enables efficient formation of a dielectric resin film of a film capacitor.

DETAILED DESCRIPTION OF THE PREFERRED EMBODIMENTS

The film capacitor and the film for film capacitors of various embodiments of the present invention are described below.

The present invention is not limited to the following features and may be suitably modified without departing from the gist of the present invention.

Combinations of two or more preferred features described in the following are also within the scope of the present invention.

Film Capacitor

The film capacitor of the present invention includes a dielectric resin film and a metal layer provided on at least one surface of the dielectric resin film.

For example, the film capacitor of the present invention may have a pillar shape having an oblong cross section, and may include external terminal electrodes formed by, for example, metal spraying (metallikon) at both ends of the pillar shape in the central axis direction.

Hereinbelow, an embodiment of a film capacitor of the present invention is described as an example, which is a wound film capacitor including a first dielectric resin film provided with a first metal layer and a second dielectric resin film provided with a second metal layer that are wound in a laminate state. The film capacitor of the present invention may be, for example, a laminate film capacitor including a first dielectric resin film provided with a first metal layer and a second dielectric resin film provided with a second metal layer that are laminated. The film capacitor of the present invention may be, for example, a film capacitor including a first dielectric resin film provided with a first metal layer and a second metal layer and a second dielectric resin film provided with no metal layer that are wound or laminated.

Figure 1:
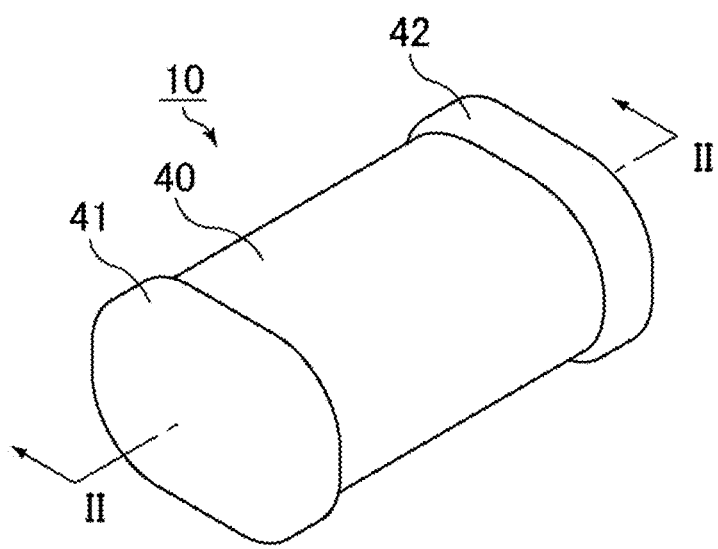
FIG. 1 is a schematic perspective view of an example of a film capacitor of the present invention.
Figure 2:
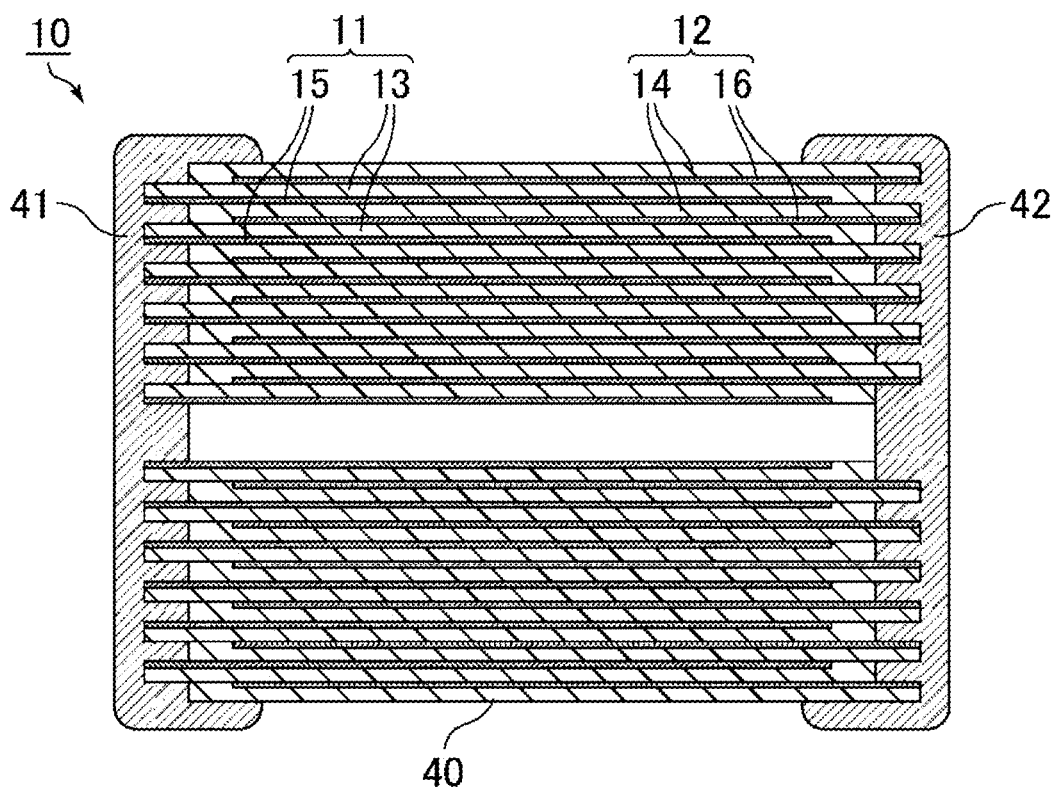
FIG. 2 is a cross-sectional view of the film capacitor shown in FIG. 1 taken along the line II-II.

FIG. 1 is a schematic perspective view of an example of a film capacitor of the present invention. FIG. 2 is a cross-sectional view of the film capacitor shown in FIG. 1 taken along the line II-II.

A film capacitor 10 shown in FIG. 1 and FIG. 2 is a wound film capacitor and includes a wound body 40 of metallized films including a first metallized film 11 and a second metallized film 12 that are wound in a laminate state, and a first external terminal electrode 41 and a second external terminal electrode 42 connected to respective ends of the wound body 40 of the metallized films. As shown in FIG. 2, the first metallized film 11 includes a first dielectric resin film 13 and a first metal layer (counter electrode) 15 provided on one surface of the first dielectric resin film 13, while the second metallized film 12 includes a second dielectric resin film 14 and a second metal layer (counter electrode) 16 provided on one surface of the second dielectric resin film 14.

As shown in FIG. 2, the first metal layer 15 and the second metal layer 16 face each other across the first dielectric resin film 13 or the second dielectric resin film 14. The first metal layer 15 is electrically connected to the first external terminal electrode 41, while the second metal layer 16 is electrically connected to the second external terminal electrode 42.

The first dielectric resin film 13 and the second dielectric resin film 14 may have different structures, but preferably have the same structure.

The first metal layer 15 is provided on one surface of the first dielectric resin film 13 such that it extends to a first side edge but not to a second side edge. The second metal layer 16 is provided on one surface of the second dielectric resin film 14 such that it extends to the second side edge but not to the first side edge. The first metal layer 15 and the second metal layer 16 may be aluminum layers, for example.

Figure 3:
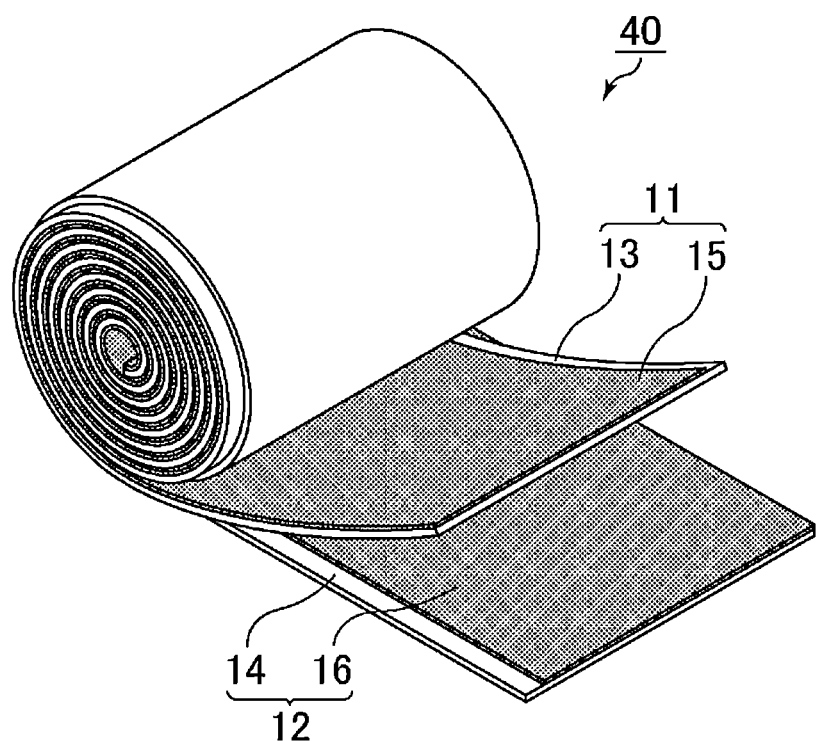
FIG. 3 is a schematic perspective view of an example of a wound body of metallized films defining the film capacitor shown in FIG. 1 and FIG. 2.

FIG. 3 is a schematic perspective view of an example of a wound body of metallized films defining the film capacitor shown in FIG. 1 and FIG. 2.

As shown in FIG. 2 and FIG. 3, the first dielectric resin film 13 and the second dielectric resin film 14 are laminated while they are shifted from each other in a width direction (in FIG. 2, a left-to-right direction) such that one end of the first metal layer 15 which extends to the side edge of the first dielectric resin film 13 and one end of the second metal layer 16 which extends to the side edge of the second dielectric resin film 14 are exposed from the laminated films. The first dielectric resin film 13 and the second dielectric resin film 14 are wound in a laminated state into the wound body 40 of the metallized films. Thereby, the first metal layer 15 and the second metal layer 16 are in a laminated state while they maintain a state in which one end of the first metal layer 15 and one end of the second metal layer 16 are exposed.

In FIG. 2 and FIG. 3, the first dielectric resin film 13 and the second dielectric resin film 14 are wound such that the second dielectric resin film 14 is outside the first dielectric resin film 13 and that the first metal layer 15 and the second metal layer 16 face inside.

The first external terminal electrode 41 and the second external terminal electrode 42 are formed by, for example, thermal spraying of zinc onto the respective end surfaces of the wound body 40 of the metallized films obtained as described above. The first external terminal electrode 41 is in contact with the exposed end of the first metal layer 15, and is thereby electrically connected to the first metal layer 15. The second external terminal electrode 42 is in contact with the exposed end of the second metal layer 16, and is thereby electrically connected to the second metal layer 16.

In the film capacitor of the present invention, preferably, the wound body of the metallized films is pressed into a flat shape having an oval or oblong cross section so as to have a more compact shape than that having a perfectly circular cross section. The film capacitor of the present invention may include a cylindrical winding shaft. The winding shaft is arranged on the central axis of the wound metallized films and serves as a spool for winding the metallized films.

In the film capacitor of the present invention, examples of the metal contained in the metal layers include aluminum (Al), titanium (Ti), zinc (Zn), magnesium (Mg), tin (Sn), and nickel (Ni).

In the film capacitor of the present invention, the metal layers each may have any thickness, such as 5 nm to 40 nm.

The thickness of each metal layer can be determined by observation of a cross section obtained by cutting the dielectric resin film provided with the metal layer in the thickness direction using an electron microscope such as a field emission scanning electron microscope (FE-SEM).

In the film capacitor of the present invention, each metal layer is preferably provided with a fuse portion.

The fuse portion means a portion connecting electrode portions which are formed by dividing the metal layer, which serve as a counter electrode, into multiple portions. The metal layer including a fuse portion may have any pattern, such as an electrode pattern disclosed in JP 2004-363431 A or JP H05-251266 A.

In the film capacitor of the present invention, each dielectric resin film used is the film for film capacitors of the present invention. For example, in the film capacitor 10 shown in FIG. 1 and FIG. 2, the film for film capacitors of the present invention may be used for both of the first dielectric resin film 13 and the second dielectric resin film 14, or the film for film capacitors of the present invention may be used for either one of these. When the film for film capacitors of the present invention is used for both of the first dielectric resin film and the second dielectric resin film in the film capacitor of the present invention, they may be the films for film capacitors of the same aspect or may be the films for film capacitors of different aspects.

Film for Film Capacitors

The film for film capacitors of the present invention contains a cured product of a first organic material and a second organic material. Specifically, the film for film capacitors of the present invention contains a cured product obtainable by a reaction between a hydroxy group (OH group) of the first organic material and an isocyanate group (NCO group) of the second organic material.

The first organic material contains an organic polymer having a hydroxy group and a benzene ring in a repeating unit. The first organic material preferably contains a phenoxy resin.

The second organic material contains 4,4'-diphenylmethane diisocyanate, a modified product of 4,4'-diphenylmethane diisocyanate, or a mixture thereof.

When a cured product is obtained by the above reaction, the resulting films may contain uncured residues of the starting materials. For example, the film for film capacitors of the present invention may contain at least one of a hydroxy group or an isocyanate group. In this case, the film for film capacitors of the present invention may contain either one of a hydroxy group or an isocyanate group or may contain both a hydroxy group and an isocyanate group.

The presence of a hydroxy group and/or an isocyanate group can be confirmed using a Fourier transform infrared (FT-IR) spectrophotometer.

In the first aspect of the film for film capacitors of the present invention, 400 ppm to 700 ppm of chlorine ions and 300 ppm to 500 ppm of phosphorus ions are present inside the film.

In the second aspect of the film for film capacitors of the present invention, 400 ppm to 700 ppm of chlorine ions are present inside the film.

In the third aspect of the film for film capacitors of the present invention, 300 ppm to 500 ppm of phosphorus ions are present inside the film.

In common films for film capacitors, chlorine ions and phosphorus ions serve as impurities and each amount to less than 300 ppm. This is because the presence of these ions in the films seems to cause reduction in electric properties of film capacitors due to electric conductivity of the ions.

Contrary to this common technical knowledge, the presence of 400 ppm to 700 ppm of chlorine ions (chloride ions) in the film is found to improve the long-term reliability of the film. In other words, the presence of 400 ppm to 700 ppm of chlorine ions in the film can reduce the percentage change in insulation resistance in a long-term high-temperature voltage application test.

Further, the presence of 300 ppm to 500 ppm of phosphorus ions in the film is found to promote the reaction of a hydroxy group in the first organic material, such as a phenoxy resin, and an isocyanate group in the second organic material, such as diphenylmethane diisocyanate, improving the efficiency of film formation. In other words, the presence of 300 ppm to 500 ppm of phosphorus ions in the film can lead to an isocyanate reaction percentage of 100% in the cured film.

The amount of chlorine ions in the film is a value determined by combustion ion chromatography. The amount of phosphorus ions in the film is a value determined by inductively coupled plasma atomic emission spectroscopy (ICP-AES).

The chlorine ions in the film are derived from, for example, epichlorohydrin used in synthesis of the first organic material such as a phenoxy resin. The amount of chlorine ions can be adjusted by controlling the amount of epichlorohydrin residues in the film.

The phosphorus ions in the film are derived from, for example, a catalyst used in the reaction between the first organic material and the second organic material. The amount of phosphorus ions can be adjusted by controlling the amount of catalyst residues in the film.

The film for film capacitors of the present invention may contain an additive that provides another function. For example, addition of a leveling agent can provide smoothness. A more preferred additive is a material having a functional group that reacts with a hydroxy group and/or an isocyanate group and thus forms part of the crosslinked structure of the cured product. Examples of such a material include a resin having at least one functional group selected from the group consisting of an epoxy group, a silanol group, and a carboxy group.

The film for film capacitors of the present invention may have any thickness, but too thin a film may be brittle. Thus, the thickness of the film for film capacitors of the present invention is preferably 1 µm or greater, more preferably 3 µm or greater. Too thick a film may easily suffer defects such as cracking during film formation. Thus, the thickness of the film for film capacitors of the present invention is preferably 10 ∥m or smaller, more preferably 5 µm or smaller.

The thickness of the film means the thickness of the film alone excluding the thicknesses of the metal layers. The thickness of the film can be measured using an optical film thickness gauge.

Method of Producing Film for Film Capacitors

The film for film capacitors of the present invention is obtainable by molding a resin solution containing the first organic material and the second organic material into a film and then curing the film by heat treatment.

The resin solution may be prepared by, for example, dissolving and mixing the aforementioned first organic material and second organic material in a solvent, optionally followed by addition of an additive. The cured film may contain the solvent in the resin solution as a residue. The weight ratio of the first organic material to the second organic material (first organic material/second organic material) is preferably 50/50 to 75/25.

The solvent used is preferably a solvent mixture containing methyl ethyl ketone (MEK) and tetrahydrofuran (THF).

The weight ratio of MEK to THF (MEK/THF) is preferably 15/85 to 85/15.

Method of Producing Film Capacitor

Next, an example of a method of producing the film capacitor of the present invention is described.

First, the film for film capacitors of the present invention is prepared as a dielectric resin film and a metal layer is formed on one surface of the dielectric resin film. Thereby, a metallized film is obtained. The metal layer may be formed by, for example, vapor deposition.

Two sheets of the metallized films each including a metal layer on one surface of the dielectric resin film are stacked while they are shifted in a width direction by a predetermined distance, and then wound. Thereby, a laminate is obtained. If necessary, the laminate may be pressed in the direction perpendicular to the width direction and thereby formed into an oval cylinder.

Then, external terminal electrodes are formed on the end surfaces of the laminate. Thereby, a film capacitor as shown in FIG. 1 is obtained. The external terminal electrodes on the end surfaces of the laminate may be formed by thermal spraying, for example.

EXAMPLES

Examples that more specifically disclose the film capacitor and film for film capacitors of the present invention are described below. The present invention is not limited to these examples.

Production of Samples

Example 1

A phenoxy resin containing chlorine ions and phosphorus ions was prepared as the first organic material and a mixture of 4,4'-diphenylmethane diisocyanate (MDI) and a modified product thereof was prepared as the second organic material.

The first organic material and the second organic material were dissolved and mixed in a solvent mixture of MEK and THF. A silicone-containing surface additive BYK370 (available from BYK Japan KK) was then added, whereby a coating composition (resin solution) was prepared. The weight ratio of the first organic material to the second organic material (first organic material/second organic material) was 70/30 and the weight ratio of MEK to THF (MEK/THF) was 85/15.

The coating composition was applied to a base film, a polyethylene terephthalate (PET) film, and exposed to 70° C. hot air, so that the solvent was evaporated. The product was peeled from the PET film, whereby a film having a thickness of 3 μm was formed. The resulting film was cured by heat treatment at 150° C. for four hours.

An Al film having a thickness of 20 nm was then formed on each surface of the film by vacuum evaporation. Thereby, a sample of Example 1 was produced.

Example 2

A sample was produced as in Example 1 except that a phenoxy resin used contained a larger amount of chlorine ions than in Example 1.

Example 3

A sample was produced as in Example 1 except that a phenoxy resin used contained a smaller amount of phosphorus ions than in Example 1.

Comparative Example 1

A sample was produced as in Example 1 except that a phenoxy resin used contained a significantly larger amount of chlorine ions than in Example 1.

Comparative Example 2

A sample was produced as in Example 1 except that a phenoxy resin used contained a significantly smaller amount of chlorine ions than in Example 1.

Comparative Example 3

A sample was produced as in Example 1 except that a phenoxy resin used contained a significantly smaller amount of phosphorus ions than in Example 1.

Comparative Example 4

An attempt to produce a sample was made as in Example 1 except that a phenoxy resin used contained a significantly larger amount of phosphorus ions than in Example 1. However, solidification occurred during preparation of the resin solution, resulting in a failure in production of the sample.

Measurement of Amount of Chlorine Ions in Film

The thermoset film was analyzed by combustion ion chromatography, whereby the amount of the chlorine ions in the film was measured.

Measurement of Amount of Phosphorus Ions in Film

The thermoset film was analyzed by ICP-AES, whereby the amount of the phosphorus ions in the film was measured.

Measurement of Isocyanate Reaction Percentage

The thermoset film was subjected to FT-IR measurement by attenuated total reflection (ATR). For the peak assigned to isocyanate groups around 2275 $cm^{-1}$, the intensity after solvent evaporation and the intensity after heat treatment at 150° C. for four hours were compared to give the isocyanate reaction percentage. A FT-IR device used was FT/IR-4100 available from JASCO Corp.

Long-term Reliability Test on Film

Voltage at 150 V/μm was applied to the sample provided with the Al films on the respective surfaces of the film in a 125° C. atmosphere, and the percentage change in volume resistivity of the film after 2500 hours was determined. The volume resistivity was measured using an ultra-high resistance meter 8340A available from ADC Corp.

TABLE 1

| Sample | Amount of chlorine ions [ppm] | Amount of phosphorus ions [ppm] | Isocyanate reaction percentage | Long-term reliability test Percentage change in volume resistivity |
|---|---|---|---|---|
| Example 1 | 581 | 439 | 100% | 3.1% |
| Example 2 | 631 | 483 | 100% | 3% |
| Example 3 | 570 | 315 | 100% | 3.3% |
| Comparative Example 1 | 991 | 434 | 100% | 15% |
| Comparative Example 2 | 297 | 430 | 100% | 10.2% |
| Comparative Example 3 | 581 | 287 | 85% | 3.2% |
| Comparative Example 4 | 565 | 726 | Solidification occurred during preparation of resin solution | Not measurable |

In Examples 1 to 3, the film had a reaction percentage of 100% and had excellent long-term reliability.

In Comparative Example 1 where the film contained too large an amount of chlorine ions, the film had reduced long-term reliability.

In Comparative Example 2 where the film contained too small an amount of chlorine ions, the film had reduced long-term reliability.

In Comparative Example 3 where the film contained too small an amount of phosphorus ions, the film had a reduced reaction percentage.

In Comparative Example 4 where the film contained too large an amount of phosphorus ions, no film was formed.

REFERENCE SIGNS LIST 10 film capacitor
11 first metallized film
12 second metallized film
13 first dielectric resin film
14 second dielectric resin film
15 first metal layer
16 second metal layer
40 wound body of metallized films
41 first external terminal electrode
42 second external terminal electrode

The invention claimed is:

1. A film capacitor comprising:
a dielectric resin film containing a cured product of a first organic material and a second organic material; and
a metal layer on at least one surface of the dielectric resin film,
the first organic material containing an organic polymer having a hydroxy group and a benzene ring in a repeating unit,
the second organic material containing 4,4'-diphenylmethane diisocyanate, a modified product of 4,4'-diphenylmethane diisocyanate, or a mixture thereof, and
wherein 400 ppm to 700 ppm of chlorine ions and 300 ppm to 500 ppm of phosphorus ions are present inside the dielectric resin film.

2. The film capacitor according to claim 1, wherein the first organic material contains a phenoxy resin.

3. The film capacitor according to claim 1, wherein the metal layer has a thickness of 5 nm to 40 nm.

4. The film capacitor according to claim 1, wherein the dielectric resin film has a thickness of 1 μm to 10 μm.

5. A film capacitor comprising:
a dielectric resin film containing a cured product of a first organic material and a second organic material; and
a metal layer on at least one surface of the dielectric resin film,
the first organic material containing an organic polymer having a hydroxy group and a benzene ring in a repeating unit,
the second organic material containing 4,4'-diphenylmethane diisocyanate, a modified product thereof, or a mixture thereof,
wherein 400 ppm to 700 ppm of chlorine ions are present inside the dielectric resin film.

6. The film capacitor according to claim 5, wherein the first organic material contains a phenoxy resin.

7. The film capacitor according to claim 5, wherein the metal layer has a thickness of 5 nm to 40 nm.

8. The film capacitor according to claim 5, wherein the dielectric resin film has a thickness of 1 μm to 10 μm.

9. A film capacitor comprising:
a dielectric resin film containing a cured product of a first organic material and a second organic material; and
a metal layer on at least one surface of the dielectric resin film,
the first organic material containing an organic polymer having a hydroxy group and a benzene ring in a repeating unit,
the second organic material containing 4,4'-diphenylmethane diisocyanate, a modified product thereof, or a mixture thereof,
wherein 300 ppm to 500 ppm of phosphorus ions are present inside the dielectric resin film.

10. The film capacitor according to claim 9, wherein the first organic material contains a phenoxy resin.

11. The film capacitor according to claim 9, wherein the metal layer has a thickness of 5 nm to 40 nm.

12. The film capacitor according to claim 9, wherein the dielectric resin film has a thickness of 1 μm to 10 μm.

13. A film for film capacitors, the film comprising:
a cured product of a first organic material and a second organic material,
the first organic material containing an organic polymer having a hydroxy group and a benzene ring in a repeating unit,
the second organic material containing 4,4'-diphenylmethane diisocyanate, a modified product of 4,4'-diphenylmethane diisocyanate, or a mixture thereof,
wherein 400 ppm to 700 ppm of chlorine ions and 300 ppm to 500 ppm of phosphorus ions are present inside the film.

14. The film for film capacitors according to claim 13, wherein the first organic material contains a phenoxy resin.

15. The film for film capacitor according to claim 13, wherein the film has a thickness of 1 μm to 10 μm.

16. A film for film capacitors, the film comprising:
a cured product of a first organic material and a second organic material,
the first organic material containing an organic polymer having a hydroxy group and a benzene ring in a repeating unit,
the second organic material containing 4,4'-diphenylmethane diisocyanate, a modified product of 4,4'-diphenylmethane diisocyanate, or a mixture thereof,
wherein 400 ppm to 700 ppm of chlorine ions are present inside the film.

17. The film for film capacitors according to claim 16, wherein the first organic material contains a phenoxy resin.

18. The film for film capacitor according to claim 16, wherein the film has a thickness of 1 μm to 10 μm.

19. A film for film capacitors, the film comprising:
a cured product of a first organic material and a second organic material,
the first organic material containing an organic polymer having a hydroxy group and a benzene ring in a repeating unit,
the second organic material containing 4,4'-diphenylmethane diisocyanate, a modified product of 4,4'-diphenylmethane diisocyanate, or a mixture thereof,
wherein 300 ppm to 500 ppm of phosphorus ions are present inside the film.

20. The film for film capacitors according to claim 19, wherein the first organic material contains a phenoxy resin.

* * * * *